Sept. 17, 1968         W. C. WEHNER         3,401,965
BALL JOINT
Filed Jan. 13, 1966         3 Sheets-Sheet 1
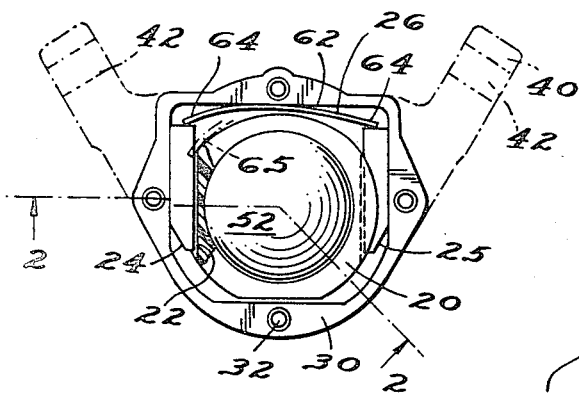
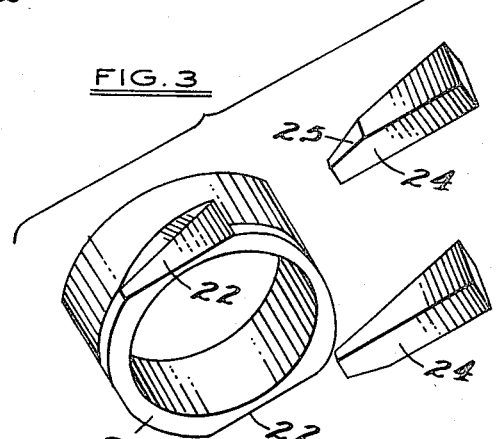
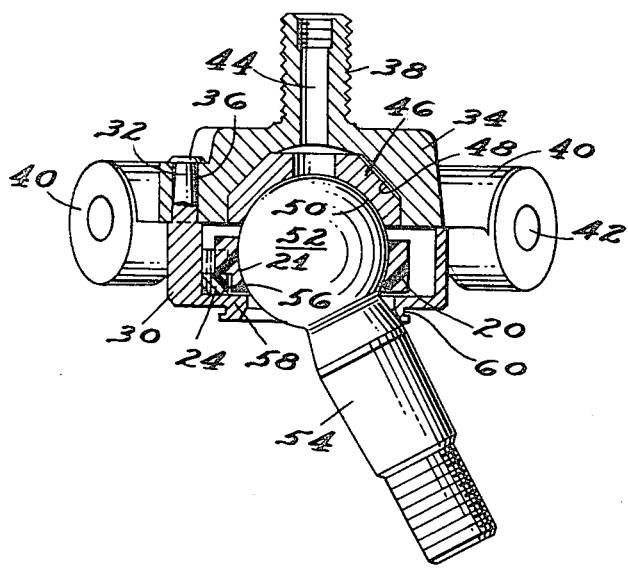
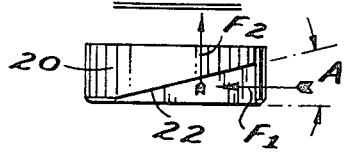
INVENTOR
WILLIAM C. WEHNER
BY
*Burton & Parker*
ATTORNEYS Sept. 17, 1968     W. C. WEHNER     3,401,965
BALL JOINT
Filed Jan. 13, 1966             3 Sheets-Sheet 2
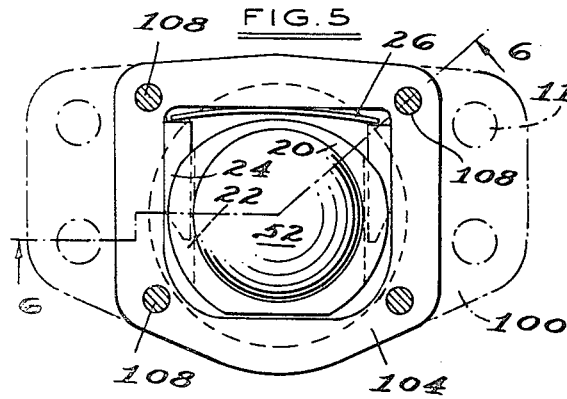
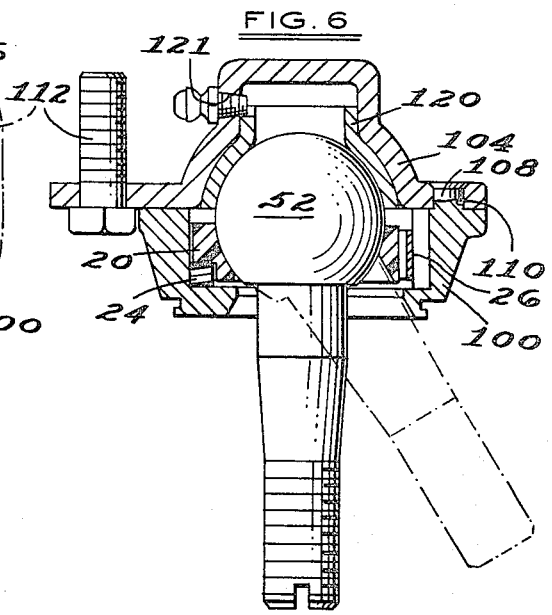
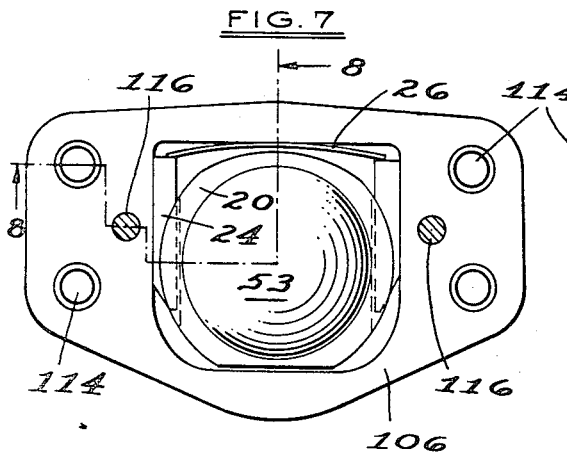
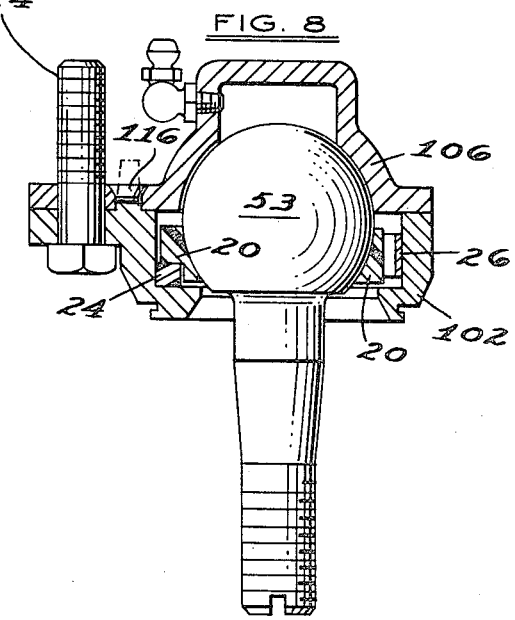
INVENTOR
WILLIAM C. WEHNER
BY
*Burton & Parker*
ATTORNEYS Sept. 17, 1968  W. C. WEHNER  3,401,965
BALL JOINT
Filed Jan. 13, 1966  3 Sheets-Sheet 3
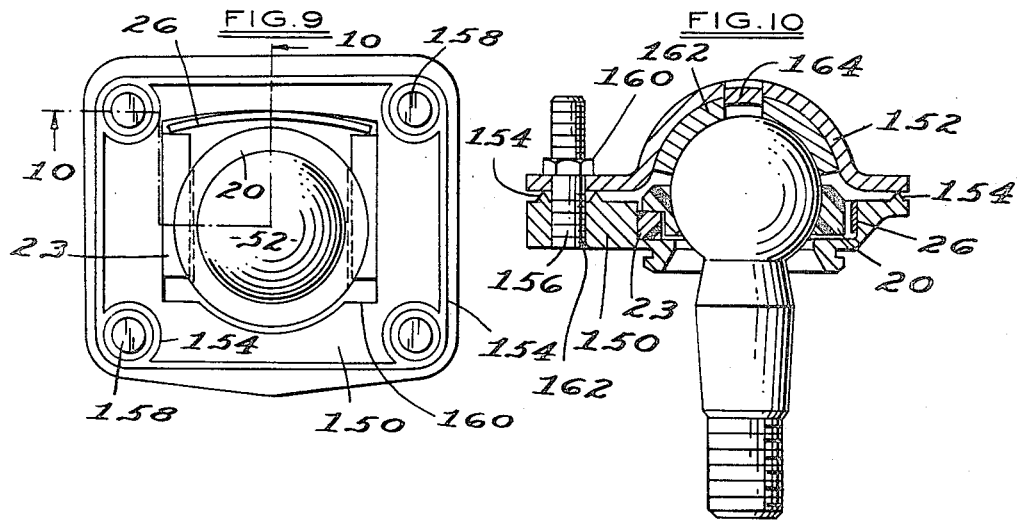
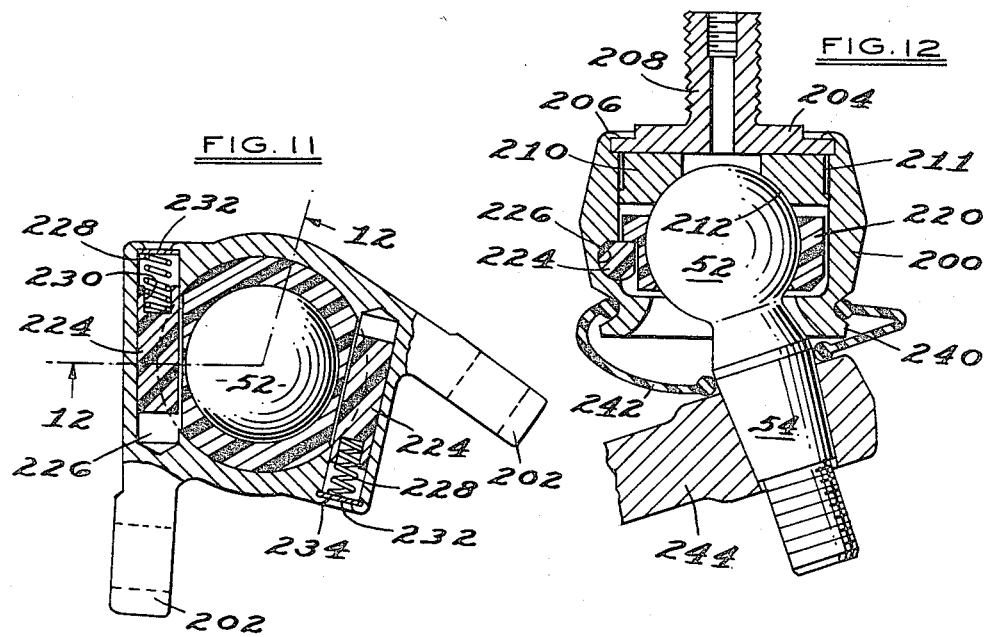
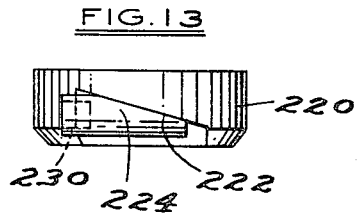
INVENTOR
WILLIAM C. WEHNER
BY
*Burton & Parker*
ATTORNEYS

United States Patent Office 3,401,965
Patented Sept. 17, 1968

3,401,965
BALL JOINT
William C. Wehner, Detroit, Mich., assignor to Moog Industries, Inc., St. Louis, Mo., a corporation of Missouri
Filed Jan. 13, 1966, Ser. No. 520,484
5 Claims. (Cl. 287—90)

ABSTRACT OF THE DISCLOSURE

This disclosure relates to a self-adjustng compression loaded ball joint, having a pair of independently shiftable wedge shaped members disposed in wedging engagement between the shiftable secondary bearing element and the housing, to constantly urge the stud head toward the primary bearing face. The wedge members are substantially diametrically opposed, and are independently urged by a spring means to provide universal adjustment for the joint.

---

This invention relates to improvements in self-adjusting swivel joints, having particular though not exclusive utility in ball joints of the compression loaded type employed in automotive wheel suspension systems.

In a compression loaded ball joint the primary loading on the ball joint tends to force the ball stud head into the housing socket against the opposed or primary bearing surfaces. In tension loaded ball joints the primary loading tends to pull the ball out of the housing socket. The ball joints in an automotive suspension system support the weight of the vehicle, and may be either compression or tension loaded, and many systems employ both types of joints.

The ball joints of an automotive suspension system are subjected to forces which tend to lift the ball members from their primary bearing surfaces. Such forces occur during acceleration and deceleration of the vehicle, and during cornering. These forces may also result from road shocks and vibration. Conventional automotive ball joints are designed with clearances between the ball head and the opposed bearing surfaces. These clearances will increase with wear. Thus, the ball head will repeatedly impact against the opposed bearing surfaces as the ball head is lifted from its primary bearing surface, and is driven back by the weight of the vehicle against the primary bearing surface. This impact loading develops very large forces, which increase with wear, until the ball joint is literally pounded apart.

The proposed solution to this problem is basically similar for the compression or tension loaded ball joint. The ball joint must be automatically adjusted to continuously and "nonreversibly" urge the ball head against its primary bearing surface. By "nonreversibly" I mean that the ball head must be maintained against its primary bearing surface during the reverse loading described hereinabove. However, because the functional requirements of the compression and tension loaded ball joints are quite different, as described above, the structural embodiments required to achieve this result must also be different.

Another problem has been the design of an automatically adjustable ball joint that does not require a substantial increase in size over the conventional ball joints, and which is interchangeable with conventional ball joint systems. A substantial increase in size will result in additional expense, and might require redesign of the suspension system. Further, to be commercially acceptable, an automatically adjustable ball joint must not require any substantial increase in cost over the conventional nonadjustable or manually adjustable ball joints.

An object of this invention is therefore to provide a compression loaded ball joint which automatically maintains a zero clearanec between the ball head and the axially related load bearing surfaces, while retaining the requisite freedom of movement, thus eliminating the need for manual adjustment.

Another object is to provide an automtically adjustable compression loaded ball joint suitable for use in automotive wheel suspension systems, which eliminates the need for service, and which is comparable in cost to conventional nonadjustable and manually adjustable ball joints.

Another object of the invention is to provide a ball joint which is interchangeable in conventional ball joint systems with an automatically operable wear-takeup unit, and to provide simple means for sealing the assembly so that foreign matter is excluded from the interior working portions of the unit.

The self-adjusting ball joint of my invention includes a housing having an open ended socket therein, a primary bearing surface opposite the open end of the socket, a shiftable secondary bearing element within the socket having a bearing surface opposite the primary bearing surface, and a stud having an enlarged head disposed in bearing engagement with the aforesaid bearing surfaces. A pair of independently shiftable wedge shaped members are disposed in wedging engagement between the shiftable secondary bearing element and an opposed surface of the device, to constantly urge the stud head into bearing engagement with the primary bearing surface. A spring means is independently tensioned between the wedge members and a portion of the device, and the wedge members are substantially diametrically opposed to provide universal adjustment for the joint.

In the preferred embodiment of the ball joint of my invention, the secondary bearing element is annular, and provided with a pair of inclined slots on the opposite sides of the annular opening which receives the wedge shaped members. The spring means is preferably a cantilever spring tensioned near its midportion against the device, and tensioned against the wedge shaped members at its opposite ends. In the other embodiment of the ball joint of my invention, the spring means includes a pair of independent spiral springs tensioned at one end against said device, and tensioned at the opposite end against one of said wedge members.

Other objects, advantages and meritorious features will more fully appear from the specification, claims and accompanying drawings, wherein:

FIG. 1 is a top elevation, with the housing cover removed, of one embodiment of my invention partially cross-sectioned to show details of the wedge member;

FIG. 2 is a cross-sectional view of FIG. 1 in the direction of view arrows 2—2;

FIG. 3 is an exploded perspective view of the wedge members and the annular bearing member;

FIG. 4 is a side elevation of the members shown in FIG. 3;

FIG. 5 is a top elevation, with the cover removed, of another embodiment of my invention;

FIG. 6 is a cross-sectional view of FIG. 5 in the direction of view arrows 6—6;

FIG. 7 is a top elevation, with the cover removed, of another embodiment of my invention;

FIG. 8 is a cross-sectional view of FIG. 7 in the direction of view arrows 8—8;

FIG. 9 is a top elevation, with the cover removed, of another embodiment of my invention;

FIG. 10 is a cross-sectional view of FIG. 9 in the direction of view arrows 10—10;

FIG. 11 is a top elevation cross section of another embodiment of my invention;

FIG. 12 is a cross-sectional view of FIG. 11 in the direction of view arrows 12—12; and FIG. 13 is a side elevation of the wedge members and the annular bearing element employed in FIGS. 11 and 12.

The embodiments of my invention illustrated and described herein have certain common features and elements which may be described generally prior to the detailed description of the structure which follows. Each embodiment has a housing, which may be formed of two sections as shown. Defined within the housing is an open-ended socket for retention of the stud head. Opposite the open end of the socket is the primary spherical bearing surface.

The enlarged spherical head of the stud is normally retained against the primary bearing surface by the mass of the vehicle, and the tilting of the ball stud causes wear of the bearing surface and the stud head. Another factor to be considered in the design of an automatically adjustable ball joint is that neither the stud head nor the bearing surfaces will be perfectly spherical, and the mating surfaces will therefore seldom, if ever, be identical. The irregularities in the surfaces may cause galling or locking of the stud head, and prevent the freedom of tilting required for a smooth acting ball joint.

Many solutions to these problems have been proposed by the prior art including the use of resilient materials, such as Teflon or rubber, for the bearing material. However, these solutions while solving the problem of the ball stud galling, create a more serious problem, termed "backlash." A resilient bearing will yield under shock loading, momentarily increasing the clearance between the opposed bearing surfaces, thereby allowing the stud head to axially shift within the socket, and repeatedly impact the bearing surfaces during reverse loading, or "backlash."

I have solved this problem without the use of a resilient bearing material by employing a bearing system wherein one of the bearing elements is free to "float" laterally to compensate for misalignment, and the secondary bearing element is continuously and nonreversibly urged against the stud head, to maintain the bearing engagement between the stud head and the primary bearing surface. A "zero-clearance" is thereby maintained with a substantially rigid primary bearing.

The primary bearing may thus be made of such materials as oil impregnated compressed powder metal alloys, or other well known bearing materials. Another bearing material which has been found especially suitable, is a malleable metal such as lead, copper or bronze. The bearing may also be a composite material, wherein the bearing surface is a malleable metal coating on the housing or a bearing insert. Such materials will deform slightly under the primary loading of the weight of the vehicle to more accurately conform to the shape of the stud head, and will not yield under the instantaneous shock loading, hereinabove described.

An embodiment of the wedge bearing means is illustrated in FIGS. 3 and 4, which includes an annular bearing element 20, having a pair of inclined slots 22, and a pair of wedge-shaped members 24, which are wedgingly received within the tapered slots to urge the annular bearing against the ball head. The wedge-shaped members are continuously urged into the inclined slots by a spring means reacting against the housing socket wall, and the resultant force against the annular bearing element continuously and nonreversibly urges the ball head against the opposed primary bearing surface.

The annular bearing is preferably made from a relatively nonresilient material which will cold flow under the contemplated range of compresive forces built into the ball joint, but which will not deform under shock or impact loading. The ability of the bearing 20 to cold flow under compressive forces, allows the bearing to compensate for dimensional tolerances inherent in the bearing and the stud head, while maintaining the requisite tightness for a "zero clearance" condition. The bearing should also be capable of absorbing metal particles resulting from wear of the stud member and the bearing surfaces. A cold flowing material will deform to accept these particles, without sacrificing its bearing capacity. A bearing material which meets these requirements is a hard thermoplastic resin, such as the family of acetal resins. An example of this material is Du Pont Delrin, however other suitable materials may be used, such as nylon or other thermoplastic resinous materials. The lower bearing might also be metallic, however the lower bearing 20 is preferably not of the same material as the wedge-shaped members, to prevent "freezing" of the mating surfaces.

The wedge members 24 may be made of any suitable material. The wedge members are preferably substantially ripid, and made from a friction resistant material which will wedgingly shift betwen the metallic housing and the annular bearing. A material which has been found to meet these requirements is the family of rigid nylon resin molding compounds, such as molded Du Pont Zytel. Other materials, such as steel, have also been successfully employed, and the materials referred to herein should not be construed to limit my invention, as they are cited merely to illustrate the efficient and inexpensive embodiments of my invention.

An important common feature of the illustrated embodiments of my invention is the continuous and "nonreversible" urging of the stud head substantially in the axis of the stud against the primary bearing surface. As stated herein, the tilting of the stud head, under the weight of the vehicle, causes wear, and it can be seen upon examination of the drawings that this wear will primarily occur substantially in the axis of the stud. Therefore, a self adjusting ball joint should react to urge the enlarged stud head substantially in the axis of the stud, if it is to be effective in taking up wear in the joint. This fact has apparently not been appreciated by the ball joints shown in the prior art, where the adjusting means reacts laterally, or perpendicular to the axis of the stud.

To provide an effective automatically adjustable ball joint, a comparatively large uniform reactant force is required, which will not reverse under the reverse loading described. This result has been achieved in the disclosed embodiments of my invention in a compact, simple, and inexpensive design.

The wedge members 24 are positioned to provide a substantially uniform upward force on the annular bearing, yet allow for misalignment between the stud head and the bearing surfaces, such as might result from unequal wear, or initial misalignment, as described herein. The wedge members 24 are received in the inclined slots 22, as shown in FIG. 3, which are located on opposite sides of the annular bearing 20, and thereby urge the bearing to provide a substantially uniform pressure against the stud head. A single cantilevered spring 26, as shown in FIG. 1, or a pair of balanced coil springs 228, as shown in FIGS. 11 to 13, equally urge the wedge members against the annular bearing. However, the wedge members are independently shiftable, and therefore will automatically shift against the annular bearing to correct for any misalignment between the bearing members.

The comparatively large upward force asserted by the annular bearing, and the "nonreversible" feature of the wedge bearing means, is substantially the result of the small wedge angle A of the wedge members and the inclined slots, as shown in FIG. 4. The upward force $F_2$, which is the force asserted by the annular bearing against the stud head, and the lateral force $F_1$, which is the force asserted by the spring against the wedge members, are related to the angle A by the following equation:

$$\frac{F_2}{F_1} = \tan(\text{angle A})$$

Thus, if the angle A is equal to 15 degrees, the resultant force $F_2$ will be equal to approximately four times the spring force $F_1$. Therefore, I have achieved a comparatively large force with a small spring. I have also found that a small wedge angle, such as 15 degrees, will be "self locking," and therefore reverse loading will not tend to force the wedge members out of the inclined slots.

Referring specifically to the embodiment shown in FIGS. 1 and 2, wherein the lower housing section 30 is provided with integral rivets 32, which extend through apertures 36 in the upper housing section 34, and which are riveted in place to firmly secure the sections together. The upper housing 34 is provided with an upwardly extending post 38, and a pair of ears 40 extending laterally. The post 38 is positioned to extend through an aperture in an automotive A-arm or the like, not shown, and a threaded nut secures the joint in place. The ears 40 are provided with apertures 42 which are used to rivet or bolt the ears to the vertically extending walls of the A-arm. The post 38 may be provided with an aperture 44 extending into the ball stud socket, which serves as an inlet for lubrication, in which case a zerk fitting or the like may be provided. The channel may also be permanently sealed, in which case the aperture will serve as a grease reservoir.

The housing sections may be formed of any suitable material; for example, the lower housing 30 may be formed of an aluminum die casting to provide excellent riveting properties, and the upper housing 34 may be formed of a metal forging to provide strength.

The upper housing of this embodiment is provided with a separate primary bearing element 46, which is press fitted into a socket counterbore 48. The bearing has a concave spherical bearing surface 50 for bearing engagement with the spherical ball stud head 52. The ball stud illustrated is conventional, and is provided with a stud portion 54 which extends out of the housing socket. The bearing 46 may be formed of any of the suitable materials described previously, such as the powdered metal alloy impregnated with oil.

The "wedge bearings," described hereinabove, comprises an annular bearing 20, encircling the ball stud 54, and a pair of wedge members 24, received in the inclined slots 22. The annular bearing of this embodiment floats within the housing socket to compensate for misalignment of the ball stud, and is provided with a spherical bearing surface 21 in bearing engagement with the opposed surface of the spherical stud head 52. The wedge members 24 are wedgingly disposed between the inclined slots 22, and an internal planar surface 56 of the lower housing. The ends of the wedge members may be tapered at the ends, as shown in FIGS. 1 and 3 at 25, to allow a greater travel of the wedge members within the housing socket. The lower housing is provided with an inwardly extending flange portion 58, which defines the planar wedge surface 56, and which terminates in a lip 60 for securement of a conventional flexible boot, not shown.

The cantilevered spring 26, shown in FIG. 1, provides the driving force for the wedge members $F_1$, see FIG. 4. The spring engages the wall of the housing socket near its midportion at 62, and is tensioned against the wedge members at its distal ends 64. As wear occurs, the spring will urge the wedge members 24 into the bearing slots 22, thereby urging the annular bearing 20 against the stud head 52. The full extent of travel of the spring is shown in phantom at 65 in FIG. 1.

FIGS. 5 to 8 illustrate two further embodiments of my invention. The "wedge bearing" may be similar to that shown in FIGS. 3 and 4, and is numbered accordingly. The lower housing section, 100 in FIGS. 5 and 6, and 102 in FIGS. 7 and 8, may be an aluminum die casting. The upper housing section, 104 in FIGS. 5 and 6, and 106 in FIGS. 7 and 8, may be a metal stamping.

In the embodiment shown in FIGS. 5 and 6 the lower housing is provided with four integral rivets 108, which extend through apertures 110 in the upper housing, and are peened over to permanently secure the housing sections together. The threaded bolts 112, which secure the joint to an automotive A-arm or the like, extend through the upper housing only.

In the embodiment shown in FIGS. 7 and 8, the lower housing 102 extends to define the same area as the upper housing 106, and the threaded bolts 114 extend through the upper and the lower housing to secure the housing sections together, and the joint to an automotive A-arm, for example. Two rivets, integral with the lower housing 102, are provided to temporarily secure and align the housing sections during shipment or storage.

The embodiment shown in FIGS. 5 and 6 employs a bearing insert 120, and a conventional ball stud 52. The upper housing is provided with a threaded aperture 121 which receives an insert, such as a zerk fitting, which will secure the bearing insert against rotation within the socket. The embodiment of FIGS. 7 and 8 utilizes the spherical internal surface of the housing socket as a bearing seat, and employs a slightly larger ball stud 53 when the same size upper housing is employed. In either embodiment the bearing surface may be of the material described hereinabove. For example, the bearing insert 120 of FIG. 6 may be a leaded or copper surfaced bronze or steel, and the internal bearing surface of the upper housing 106 of FIG. 8, may be coated with a soft metal, or the upper housing may be made from a bronze stamping.

In the embodiment shown in FIGS. 9 and 10, the lower housing 150 may be made from an aluminum die casting, and the upper housing 152 may be made from a metal stamping. The lower housing is provided with an integral upstanding seal 154, which deforms slightly under the high unit loading when the housing sections are secured together, to provide a tight seal between the sections. The housing sections are secured together in this embodiment by four threaded bolts 156, which are received in threaded apertures 158 in the lower housing. The threaded bolts 156 are provided with hexagonal flanges 160 which bear against the upper housing 152. The bolts may be secured against rotation by pricking or punch riveting, as shown at 162, which prevents loosening of the bolts when the joint is secured to an automotive A-arm or the like.

The wedge bearing illustrated is similar to the units disclosed in FIGS. 3 and 4, except that the wedge members 23 do not have tapered ends, as shown at 25 in FIG. 3, and the housing socket has been formed to provide adequate travel for the wedge members at 160.

The upper housing has been provided with a spherical bearing element 162, which may be formed of the same material as the bearing insert 120 of FIG. 6. The bearing has been secured against rotation by an insert 164.

The embodiment shown in FIGS. 11 to 13 employs the teachings of the previously described embodiment in a modified configuration. The housing 200 is a single metal forging, which has been provided with a pair of ears 202 for securing the joint to another member, as previously described. The housing is closed at one end by a cover 204, which has been spun in place at 206. The cover may be provided with an integral threaded post 208 for the purposes discussed in relation to FIG. 2. The housing socket is provided with a primary bearing 210, which has a spherical bearing surface 212 in bearing engagement with the ball stud head 52. The primary bearing 210 in this embodiment is press fitted into the housing socket with an entry relief at 211, and the secondary bearing 220 floats, as is the case in the previous embodiments, to correct for misalignment.

The "wedge bearing" of this embodiment employs an annular bearing 220, which is similar to the annular bearing 20, described hereinabove. The wedge members 224 are received in the inclined slots 222 in the annular bearing, and function the same as the wedge members 24, previously described, except that they are received in configured openings 226 in the housing wall, and are urged by separate balanced coil springs 228. The springs are received in a counterbore 230 in the wedge members, and are tensioned against the housing by a cover plate 232 which has been spun in place at 234.

The housing has been provided with a lip 240 which retains a dust boot 242. An automotive suspension control arm has been shown in phantom at 244 to illustrate the means of securement to the ball stud 54.

It is understood that several modifications may be made to the disclosed embodiments without departing from the purview of the appended claims. The improvements taught by the various embodiments may also be substituted in the other embodiments, for example, the unitary housing of FIG. 11 may be substituted for the split housing of FIG. 2.

I claim:

1. A self-adjusting compression loaded ball joint device, comprising: a housing having an open ended socket therein, a primary bearing surface opposite the open end of the socket, a secondary bearing element spaced from the open end of the socket shiftable within said socket having a spherical bearing surface opposed to said primary bearing surface within said socket, said secondary bearing element having two spaced inclined slots opposite said spherical bearing surface, a stud having an enlarged head disposed between said bearing surfaces in bearing engagement therewith having a shank projecting out of said socket through said open end, a pair of substantially diametrically opposed independently shiftable wedge shaped members slidably disposed in said tapered slots in wedging engagement between said secondary bearing element and said device for continuously urging said enlarged head into bearing engagement with the primary bearing surface of said device, and a spring means uniformly and independently tensioned between said device and said wedge shaped members to slidably and continuously urge said wedge shaped members in the aforesaid wedging motion.

2. A self-adjusting ball joint device, comrising: a housing having an open ended stud receiving socket therein, a primary bearing surface opposite the open end of the socket, and annular secondary bearing element adjacent the open end of the socket and shiftable within said socket having a spherical bearing surface opposed to said primary bearing suraface within said socket, a stud having an enlarged head disposed between said bearing surfaces in bearing engagement therewith having a shank portion projecting through said annular bearing element out of said socket, a substantially diametrically opposed pair of spaced wedge members disposed on opposite sides of said enlarged head in wedging engagement between said shiftable secondary bearing element and an opposed surface of said device arranged to shift said element toward said opposed primary bearing surface upon wedging movement of said wedge members, and a spring means independently tensioned between said wedge members and a portion of said device continuously and independently urging said wedge members in the aforesaid wedging motion.

3. The self-adjusting compression loaded ball joint device of claim 2, whrein said secondary bearing element is provided with a pair of inclined slots on opposite saides of the annular opening which cooperate with said wedge shaped members to shift said bearing element in the aforesaid motion.

4. The self-adjusting compression loaded ball joint device defined in claim 2, wherein said spring means is a cantilever spring tensioned near its midportion against said device and tensioned against said wedge shaped members at its opposed ends.

5. The self-adjusting compression loaded ball joint device defined in claim 2, wherein said spring means comprises a pair of spiral springs each tensioned at one end against said device and tensioned at their opposite ends against one of said wedge shaped members.

References Cited

UNITED STATES PATENTS

| 1,027,293 | 5/1912 | Sturt | 308—68 |
| 1,807,701 | 6/1931 | Norton | 308—66 |
| 1,894,309 | 1/1933 | Flumerfelt | 287—90 |
| 2,018,365 | 10/1935 | Klages et al. | 287—90 |
| 2,539,186 | 1/1951 | French | 287—90 |
| 2,797,930 | 7/1957 | Booth | 287—90 XR |
| 3,103,370 | 9/1963 | Krizman | 287—90 XR |
| 3,220,755 | 11/1965 | Gottschald et al. | 287—87 |
| 3,227,001 | 1/1966 | Reese | 287—90 XR |

FOREIGN PATENTS 929,873   6/1963   Great Britain.

CARL W. TOMLIN, *Primary Examiner.*

A. KUNDRAT, *Assistant Examiner.*